United States Patent [19]

Knudson et al.

[11] Patent Number: 4,643,860

[45] Date of Patent: Feb. 17, 1987

[54] PRESERVATIVE TREATED COMPOSITE WOOD PRODUCT

[75] Inventors: Robert M. Knudson, Coquitlam; Hubert Ehrenfellner, Surrey, both of Canada

[73] Assignee: MacMillan Bloedel Limited, Vancouver, Canada

[21] Appl. No.: 865,656

[22] Filed: May 16, 1986

Related U.S. Application Data

[63] Continuation of Ser. No. 708,531, Mar. 5, 1985, abandoned.

[51] Int. Cl.$^4$ .............................................. B27N 3/00
[52] U.S. Cl. .................................... 264/109; 264/128; 428/326; 428/485; 428/528; 428/529; 428/689; 428/907
[58] Field of Search ............. 428/403, 326, 528, 529, 428/485, 689, 907; 264/109, 128

[56] References Cited

U.S. PATENT DOCUMENTS

| | | | |
|---|---|---|---|
| 3,899,559 | 8/1975 | Johnanson et al. | 264/115 |
| 4,104,374 | 8/1978 | Reuther et al. | 424/185 |
| 4,241,133 | 12/1980 | Lund et al. | 428/326 |
| 4,376,088 | 3/1983 | Prather | 264/109 |
| 4,404,252 | 9/1983 | Hetzler et al. | 428/326 |

OTHER PUBLICATIONS

Schmidt et al., report submitted to the Workshop on Durability of Structural Panels; Pensacola, Florida, (Oct. 5-8, 1982).
Schmidt et al., "Preservative Treatment Effects on Mechanical and Thickness Swelling Properties of Aspen Waferboard, Proceedings of a Workshop on Durability of Structural Panels, Pensacola, Florida (Oct. 5-7, 1982).
Schmidt et al., "Strength Reductions in Particleboard Caused by Fungi," Forest Products Journal, vol. 28, No. 2, (Feb. 1978).
Adams et al., "Composite Wood Utility Poles," EL-1745, Research Project 796-1 (Mar. 1981).
Schmidt et al., "Preservative Treatment Effects on Mechanical and Thickness Swelling Properties of Aspen Waferboard"-paper presented at Treated Wood Products Session, 35th Annual Meeting of Forest Products Research Society, (Jun. 1981).

*Primary Examiner*—Marion C. McCamish
*Attorney, Agent, or Firm*—Banner, Birch, McKie & Beckett

[57] ABSTRACT

A composite wood product, such as waferboard, is treated during manufacture with preservative chemicals to improve resistance to decay and insect organisms. The process avoids having to treat a finished product and is not limited to only surface protection. Molten slack wax is first applied to wood particles having a moisture content not greater than about 10%, the wax coated wood particles are then sprayed with an ammoniacal copper arsenate solution having a concentration of at least about 11% followed by blending with adhesive resin and forming a composite wood product.

8 Claims, No Drawings

PRESERVATIVE TREATED COMPOSITE WOOD PRODUCT

This application is a continuation, of application Ser. No. 708,531, filed Mar. 5, 1985, now abandoned.

This invention relates to a composite wood product which is treated during manufacture with preservative chemicals to provide resistance to decay and insect organisms.

Lack of decay resistance in particleboard which in this application is used in its broad sense to include waferboard, oriented strandboard, flakeboard, chipboard and other similar composite wood products, tends to limit the end use of these products. Initially it was considered necessary to treat composite wood products after manufacture with preservative chemicals such as chromated copper arsenate, ammoniacal copper arsenate, pentachlorophenol, sodium pentachlorophenate and other known preservatives. Attempts to post-treat waferboard panels with both waterbased and non-waterbased preservative systems have shown a marked loss of physical and mechanical strength coupled with excessive thickness swell and poor appearance. This is especially a problem with pressure treating systems that are intended to impregnate right through the wood panels. Non-pressure treatments only affect the outside surface of the wood product and hence if the wood product is cut or has the outer surface removed, then the preservative has no effect on the exposed surface. Furthermore, a post manufacture treatment carried out on a composite wood product constitutes an additional production step thus increasing the cost of the product.

Various attempts have been made to treat waferboard products during manufacture so that the preservative chemicals extend through the waferboard. Such a product can be cut or have a surface removed and the preservative still protects all surfaces. A number of methods have been developed wherein wood particles are treated with ammoniacal copper arsenate (ACA). Some of these methods have considerable success in that the resulting particleboards have improved decay resistance and insect resistance. However, one problem exists in all existing process steps, namely that of moisture content.

When the combination of wax, adhesive and preservative is added to wood particles, they are normally in an aqueous solution and thus a quantity of water is added to the particles which increases the moisture content. To overcome this, it is generally necessary to provide a drying step after application of the preservative and in some cases, before application of the adhesive resin so that the wood particles are at a suitable moisture level. If the moisture content of wood wafers exceeds 10% when formed into a mat for introduction to a press, then steam blows can occur in the press which is unsatisfactory. Moisture content is the total amount of water in a given piece of wood expressed as a percentage of the oven dry wieght of the wood.

Tests have been carried out making an ACA/wax emulsion which is sprayed onto the wafers prior to forming waferboard panels. However, this process permits additional levels of only 0.25 lbs. per cu. ft. without an intermediate drying step. (Schmidt et al publication October 1982 by Southern Forest Experiment Station entitled "Report Submitted to the Workshop on Durability of Structural Panels: Pensacola, Fla.").

The present invention overcomes the problem of high moisture content in a mat or layer of particles without the necessity of having to pass the mat of particles through a drying step. This is achieved by first of all applying molten slack wax (which is an insoluble wax and one that does not form an emulsion with water), to the wood particles followed by application of the preservative, preferably ACA in a high concentration, and before proceeding to blend the particles with adhesive resin prior to forming mats or layups of the blended particles.

It has been found that the addition of preservative chemicals to the adhesive resin and blending the resulting preservative-resin mixture, can have an adverse effect on fungicidal activity, panel strength and stiffness. Thus, it is preferred that the preservative be added separately from the adhesive resin. Problems of thickness, swelling, surface irregularities and delamination caused by a dip or pressure treatment of boards after manufacture, are eliminated by the process of the present invention.

The present invention provides a process of producing a preservative treated composite wood product comprising the steps of: applying molten slack wax to wood particles having a moisture content not greater than about 10%, the slack wax applied representing up to about 2% by oven dry weight of the wood particles, spraying the wood particles after applying the slack wax, with an ammoniacal copper arsenate solution having a concentration of at least about 11%, at least about 0.25 lbs. of the solution being uniformly distributed per cu. ft. of the composite wood product, blending the wood particles, after applying the slack wax and the solution, with an adhesive resin, forming the wood particles into a mat, and heating and compressing the mat for a time sufficient to form a composite wood product.

In preferred embodiments, the wood particles are wood wafers and the wood product is waferboard. Molten slack wax is preferably blended with the wood wafers by spraying and the wax allowed to harden on the wafers before they are sprayed with the ammoniacal copper arsenate solution. The wood wafers are preferably aspen wafers and in one embodiment have an average length of approximately 1½ inches. Longer wafers may also be used for waferboard production.

The heating and compressing step preferably occurs at 210° C. for an interval of about five and a half minutes for 7/16 inch thick panels, and phenolformaldehyde powdered resin is blended with the wood wafers after the solution has been added to provide a resin content of not more than about 4% based on the oven dry weight of the wood wafers. Preferably the ammoniacal copper arsenate solution has a concentration of at least about 20% and at least about 0.25 lbs. of the solution is uniformly distributed per cu. ft. of the composite wood product.

In another embodiment of the invention, there is provided a preservative treated composite wood product made from wood particles blended with adhesive resin, wherein the wood particles are coated with molten slack wax up to about 2% by oven dry weight of the wood particles and including an ammoniacal copper arsenate loading of from about 0.25 to 0.60 lbs. per cu. ft. uniformly distributed in the composite wood product.

In other embodiments the wood product is waferboard and has a density of about 41 lbs. per cu. ft. An ammoniacal copper arsenate loading of 0.25 lbs. per cu. ft. is included to give an ammoniacal copper arsenate content of 0.61% based on the oven dry weight of the wood wafers. In another embodiment an ammoniacal copper arsenate loading of 0.40 lbs. per cu. ft. gives an ammoniacal copper arsenate content of 1.0% based on the oven dry weight of the wood wafers. In a still further embodiment an ammoniacal copper arsenate loading of 0.6 lbs. per cu. ft. gives an ammoniacal copper arsenate content of 1.46% based on the oven dry weight of the wood wafers. Tests have shown that a weight loss of the wood product is less than 5% after four weeks exposure in termite infested soil. The composite wood product preferably has an MOR of at least 2,500 lbs. per sq. inch, an MOE of at least 450,000 lbs. per sq. inch and an IB of at least 50 lbs. per sq. inch.

In the manufacture of waferboard, wherein wood wafers are blended with phenolformaldehyde resin at the 2 to 6% resin level based on the oven dry weight of the wafers and at commercially viable press times, the moisture content of the blended mat going into the hot press is preferably below about 10%. Under mill conditions, it is preferable to have the moisture content no higher than about 8%. Isocyanate resins have a somewhat higher moisture tolerance in the press and isocyanate bonded aspen waferboard panels can be made with a moisture content of up to about 18%, but they appear to have a significantly lower internal bond, modulus of rupture and modulus of elasticity than similar isocyanate resin bonded panels made with a moisture content not greater than 10%. In order to make a composite wood product having preservative features without requiring additional process steps, it is critical to limit the amount of moisture in the particle mat going into the press. To accomplish this, the wood particles should initially have a low moisture content, that is to say, below about 10% based on the dry weight of the particles. Slack wax is first heated to a temperature preferably in the range of about 90 to 100° C. so that it is molten. The slack wax in the molten form is applied to the wafers, preferably by spraying, and the wax allowed to harden to coat the wafers. At the next stage, a concentrated preservative solution is then sprayed onto the wax coated particles. In the case of ACA, the solution has a concentration greater than about 11%. After the wood particles have finally been blended with adhesive resin and immediately prior to pressing, the moisture content is still below about 10%.

Slack wax is applied to the particles with the wax in the molten form and having no water or other solvents present. The molten slack wax is added before the preservative to reduce the penetration of water from the preservative solution into the particles. Another advantage in adding the wax to the wood particles before the preservative is to allow further distribution of the preservative when the wax melts during the hot pressing step.

Preservative treated composite wood prodcuts such as waferboards are made by first blending or spraying dry wafers with molten slack wax at a temperature in the range of about 90 to 100° C. The slack wax is applied by spraying molten wax onto a mat or layer of wood wafers, after the wafers cool and the wax solidifies, the wax coated wafers are then sprayed with a concentrated preservative solution which is preferably ammoniacal copper arsenate solution having a concentration of at least 11% and preferably from about 20 to 21%. The spraying deposits at least about 0.25 lbs. of the ACA solution per cu. ft. of the composite wood product and the solution is evenly distributed through the mat of wood particles. Preferably from 0.25 to 0.6 lbs. per cu. ft. of the solution is distributed uniformly throughout the composite wood product. It is found that with about 0.25 lbs. of the solution uniformly distributed per cu. ft. of the composite wood product, the solution having a concentration of at least about 11%, the ACA content is about 0.61% based on the oven dry weight of the wood wafers. In the case of 0.40 lbs. per cu. ft., the ACA content is about 1.0% based on the oven dry weight of the wood wafers and for an ACA treatment level of 0.60 lbs. per cu. ft., the ACA content is about 1.46% based on the oven dry weight of the wood wafers. After the ACA solution has been sprayed on the wood wafers, they are blended with adhesive resin. In one case, 3% based on the oven dry weight of the wood wafers of a phenolformaldehyde resin powder sold under the trade mark REICHOLD BD-019 was applied. The blended wafers were then formed into mats and passed to to a press where the wafer mats were compressed and heated to a predetermined temperature for the necessary press time to cure the resin and form a composite waferboard. In one example, aspen wafers having an average length of 1½ inches were sprayed with molten slack wax, at a temperature of about 90° C., the wax allowed to solidify and the wax coated wafers sprayed with ACA solution, blended with PF resin and formed into mats which were pressed at a temperature of 210° C. for five and a half minutes. The resulting waferboard panels were 7/16 inch thick. All the panels were tested for MOR, MOE, and IB according to procedures outlined in Canadian standard CSA CAN3-0188.0-M78.

The waferboard panels had a density of 41 lbs. per cu. ft. and the starting moisture content of the wafers prior to coating with slack wax was about 2%. Table 1 shows the average strength properties of the resulting waferboard.

TABLE 1

| ACA treatment level lbs/cu ft | ACA solution concentration % | Wax content and type | Wafer mat moisture content Unblended % | Wafer mat moisture content Blended % | Press time mins. | Density lbs/ cu ft | ACA content of panel % | MOR lbs/sq in | MOE 1000 lbs/sq in | IB lbs/sq in |
|---|---|---|---|---|---|---|---|---|---|---|
| 0 control | — | 2% slack | 2.0 | 2.0 | 5½ | 41 | — | 3610 | 588 | 77 |
| 0.25 | 11.6 | 2% slack | 2.0 | 5.0 | 5½ | 41 | 0.61 | 3510 | 566 | 84 |
| 0.25 | 11.6 | 2% emulsion* | 3.5 | 8.5 | | | | | | |
| 0.25 | 22.4 | 2% slack | 2.0 | 4.0 | | | | | | |
| 0.4 | 11.6 | 2% slack | 1.5 | 8.4 | 5½ | 41 | 1.0 | 3550 | 552 | 79 |
| 0.4 | 22.4 | 2% slack | 2.0 | 4.7 | | | | | | |
| 0.6 | 22.4 | 2% slack | 1.8 | 7.1 | 5½ | 41 | 1.46 | 3410 | 558 | 77 |

TABLE 1-continued

| ACA treatment level lbs/cu ft | ACA solution concentration % | Wax content and type | Wafer mat moisture content Unblended % | Wafer mat moisture content Blended % | Press time mins. | Density lbs/cu ft | ACA content of panel % | MOR lbs/sq in | MOE 1000 lbs/sq in | IB lbs/sq in |
| --- | --- | --- | --- | --- | --- | --- | --- | --- | --- | --- |
| 0.6 | 22.4 | 2% slack | 2.0 | 6.1 | | | | | | |

*Wax emulsion is a 50% water solution mixed with ACA solution and applied to wafers.

As can be seen from Table 1, with an ACA solution concentration of 11.6% and an ACA treatment level of 0.25 lbs per cu. ft., the blended wafer mat moisture content treated with 2% molten slack wax was 5%. However, when a 2% emulsion wax was used in place of molten slack wax, the blended wafer mat moisture content was higher. When an ACA solution concentration of 22.4% was used, the moisture content was only 4%. When the ACA treatment level was increased to 0.4 lbs. per cu ft, then the blended wafer mat moisture content was 8.4% for an ACA solution concentration of 11.6%, but only 4.7% for an ACA solution concentration of 22.4%. By utilizing an ACA solution concentration of around 20%, then the blended wafer mat moisture content can be obtained well below 10% even for ACA treatment levels of 0.6 lbs. per cu. ft.

Stakes made from Aspen waferboard treated with 0.25 and 0.60 lbs. per cu. ft. ACA were placed in the ground and left there for one year. After one year there was no evidence of decay or termite attack. Stakes having no ACA treatment were also placed in the ground and weight losses for all three tests after one year of exposure were approximately 3%. The major difference between the treated and untreated stakes was that the untreated stakes showed greater colour change from weathering in the above ground portions, thus the ACA treated stake appears to prevent discolouration probably due to ultra violet rays. The stakes were weighed to determine moisture intake and measured to determine thickness swell. Thickness was measured in the center of the stakes at the ground line. Stakes were then oven dried and weighed to determine moisture content and weight loss. Inground moisture content was 23% for the uhtreated stakes, 23.7% for the 0.25 lbs. per cu. ft. ACA level and 29% for the 0.60 lbs. per cu. ft. ACA level. These moisture contents reflect sampling at the end of a relatively warm dry summer. For comparison, moisture contents of stakes removed after six months exposure were approximately 80%. Weight loss after one year for the untreated stakes was 2.63% while weight loss values for the 0.25 and 0.60 lbs. per cu. ft. levels were 2.69% and 3.16% respectively. These weight loss figures indicate that very little degradation had taken place in the one year exposure. This was surprising as it had been expected that some weight loss would have occurred in the untreated material. For comparison weight loss values for the untreated 0.25 and 0.60 lbs. per cu. ft. stakes after six months exposure was 0.95%, 1.63% and 1.66% respectively. Thickness swell for all the groups was just over 30%.

Preservative treated waferboard, untreated waferboard, aspen wood and southern pine wood were evaluated for their resistance to subterranean termites using AWPA Standard Method M12-72, "Standard Method for Laboratory Evaluation to Determine Resistance to Subterranean Termites".

Termite resistance of waferboard treated with 0.25, 0.4 and 0.6 lbs. per cu. ft. of ACA showed that ACA treated waferboard has excellent resistance to termites compared to untreated waferboard and solid wood after four weeks exposure to termite infested soils. Results are shown in Table 2.

TABLE 2

| Material | ACA Loading lb/ft$^3$ | Condition | Visual Assessment | Numerical Rating | Weight Loss % |
| --- | --- | --- | --- | --- | --- |
| Waferboard | 0.60 | unleached | sound | 10.0 | 1.51 |
| | 0.60 | leached | surface | 10.0 | 0.90 |
| | 0.40 | unleached | surface | 10.0 | 1.31 |
| | 0.40 | leached | surface | 9.8 | 0.82 |
| | 0.25 | unleached | surface | 9.8 | 2.38 |
| | 0.25 | leached | surface | 9.6 | 1.10 |
| | nil | unleached | light attack | 9.0 | 5.44 |
| Aspen wood | nil | unleached | light/moderate attack. | 7.8 | 8.42 |
| Southern pine wood | nil | unleached | heavy attack/failure. | 3.2 | 11.95 |

As can be seen, both leached and unleached samples were tested but this condition seemed to have little difference as far as weight was concerned. The numerical ratings show figures from 0 representing failure to 10 representing sound with surface nibbles permitted. 9 represents light attack, 7 represents moderate attack and penetration and 4 represents heavy attack. Samples of ACA treated waferboard showed less attack than samples of untreated waferboard. The untreated waferboard samples also had evidence of fungus fruiting bodies on their surface. Untreated waferboard had greater termite resistance than uhtreated aspen wood and untreated southern pine wood performed much worse than any of the other materials.

Weight loss also appeared to be a fairly good indicator of termite resistance, for example, leached waferboard at 0.25 lbs. per cu. ft. ACA loading had 1.10% weight loss and 9.6 numerical rating while untreated waferboard had 5.44%. weight loss and 9.0 numerical rating.

Four samples of waferboard made from aspen wood wafers and untreated aspen wood were evaluated for resistance to attack by soft rot (Chaetomium globosum) using a modified AWPA M-10-83 soil block test. As can be seen in Table 3, samples that were untreated were not resistant to attack from the test fungi whereas those treated with 0.25, 0.4 and 0.6 lbs. per cu. ft. ACA were resistant to the fungi.

TABLE 3

| Material | ACA treatment level lbs/cu ft | LEACHED Weight Loss % | LEACHED Fungal Coverage % | UNLEACHED Weight Loss % | UNLEACHED Fungal Coverage % |
| --- | --- | --- | --- | --- | --- |
| Aspen Wood | 0 | 6.7 | 90 | 7.0 | 92 |
| Waferboard | 0 | 6.8 | 53 | 9.0 | 93 |
| Waferboard | 0.25 | 1.4 | 13 | 2.5 | 19 |
| Waferboard | 0.4 | 1.2 | 16 | 2.2 | 28 |
| Waferboard | 0.6 | 0.9 | 10 | 1.6 | 29 |

Leaching of the samples reduced the growth intensity and subsequent weight losses in the waferboard, but this effect was not found with the solid aspen wood.

The embodiments of the invention in which an exclusive property or privilege is claimed are defined as follows:

1. A process of producing a preservative treated composite wood product comprising the steps of:
    applying molten slack wax to wood particles having a moisture content not greater than about 10%, the slack wax applied representing up to about 2% by oven dry weight of the wood particles,
    spraying the wood particles, after applying the slack wax, with an ammoniacal copper arsenate solution having a concentration of at least about 11%, at least about 0.25 lbs. of the solution being uniformly distributed per cu. ft. of the composite wood product,
    blending the wood particles, without a further drying step after applying the slack wax and the solution, with an adhesive resin,
    forming the wood particles into a mat, and
    heating and compressing the mat for a time sufficient to form a composite wood product.

2. The process according to claim 1 wherein the wood particles are wood wafers and the wood product is a waferboard.

3. The process according to claim 2 wherein the slack wax in molten form is blended with the wood wafers by spraying and the wax allowed to harden on the wafers before spraying the wafers with the ammoniacal copper arsenate solution.

4. The process according to claim 2 wherein the wood wafers are aspen wafers with an average length of approximately 1½ inches.

5. The process according to claim 2 wherein the mat is pressed at 210° C. for an interval of about five and a half minutes to produce a panel of about 7/16 inches thick.

6. The process according to claim 2 wherein phenol-formaldehyde powdered resin is blended with the wood wafers to provide a resin content of not more than about 4% based on the oven dry weight of the wood wafers.

7. The process according to claim 1 wherein the ammoniacal copper arsenate solution has a concentration of at least about 20% and at least about 0.25 lbs. of the solution is uniformly distributed per cu. ft. of the composite wood product.

8. A preservative treated composite wood product made according to the process of claim 1.

* * * * *